US006711356B2

United States Patent
Tanaka

(10) Patent No.: US 6,711,356 B2
(45) Date of Patent: Mar. 23, 2004

(54) REAL-IMAGE VARIABLE-MAGNIFICATION VIEWFINDER

(75) Inventor: Katsuto Tanaka, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/809,625

(22) Filed: Mar. 15, 2001

(65) Prior Publication Data

US 2001/0046384 A1 Nov. 29, 2001

(30) Foreign Application Priority Data

Mar. 21, 2000 (JP) ........................................ 2000-083247

(51) Int. Cl.⁷ .............................................. G03B 13/10
(52) U.S. Cl. ...................... 396/379; 396/382; 396/384; 359/676; 359/689; 359/784
(58) Field of Search ................................. 396/379, 382, 396/384, 385; 359/676, 690, 689, 691, 695, 784–5

(56) References Cited

U.S. PATENT DOCUMENTS

| | | | |
|---|---|---|---|
| 4,992,809 A | | 2/1991 | Nozaki et al. .......... 354/149.11 |
| 5,028,125 A | * | 7/1991 | Kikuchi ...................... 359/422 |
| 5,225,927 A | | 7/1993 | Nozaki et al. .............. 359/355 |
| 5,376,984 A | * | 12/1994 | Abe ............................ 359/432 |
| 5,627,618 A | * | 5/1997 | Kasai et al. ................ 359/688 |
| 5,694,244 A | * | 12/1997 | Abe et al. .................... 359/432 |
| 5,970,266 A | * | 10/1999 | Takato ........................ 359/432 |
| 6,035,145 A | * | 3/2000 | Kanai ......................... 359/432 |
| 6,104,532 A | * | 8/2000 | Kato ........................... 359/432 |
| 6,256,144 B1 | * | 7/2001 | Kato ........................... 359/432 |

FOREIGN PATENT DOCUMENTS

JP 06-102453 A 4/1994

OTHER PUBLICATIONS

U.S. patent application Ser. No. 09/086029, Kasai, filed May 28, 1998.

* cited by examiner

*Primary Examiner*—Russell Adams
*Assistant Examiner*—Michelle Nguyen
(74) *Attorney, Agent, or Firm*—Sidley Austin Brown & Wood LLP

(57) ABSTRACT

A real-image variable-magnification viewfinder includes objective optical system having positive optical power, eyepiece optical system having positive optical power, and erecting optical system. The objective optical system has first lens unit having positive optical power, second lens unit having negative optical power, and third lens unit having positive optical power. As zooming is performed from wide-angle end to telephoto end, second and third lens units are moved so they come closer to each other. Following conditional formulae are fulfilled: $-0.75 < m_{2W} < -0.3$, $-2 < m_{2T} < -1.05$, $-0.75 < m_{3W} < -0.3$, $-2 < m_{3T} < -1.05$, $l_2 > l_3$, where $m_{2W}$ and $m_{2T}$ represents lateral magnification of second lens unit at wide-angle end and at telephoto end, $m_{3W}$ and $m_{3T}$ represents lateral magnification of third lens unit at wide-angle end and at telephoto end, and $L_2$ and $L_3$ represent movement distance of second lens unit and of third lens unit over entire zoom range.

5 Claims, 9 Drawing Sheets

SPHERICAL ABERRATION AT THE WIDE ANGLE END
PUPIL DIAMETER 2.0 mm

ASTIGMATISM AT THE WIDE ANGLE END

DISTORTION(%) AT THE WIDE ANGLE END

SPHERICAL ABERRATION AT THE TELEPHOTO END
PUPIL DIAMETER 2.0 mm

ASTIGMATISM AT THE TELEPHOTO END

DISTORTION(%) AT THE TELEPHOTO END

SPHERICAL ABERRATION AT THE WIDE ANGLE END
PUPIL DIAMETER 2.0 mm

ASTIGMATISM AT THE WIDE ANGLE END

DISTORTION(%) AT THE WIDE ANGLE END

SPHERICAL ABERRATION AT THE TELEPHOTO END
PUPIL DIAMETER 2.0 mm

ASTIGMATISM AT THE TELEPHOTO END

DISTORTION(%) AT THE TELEPHOTO END

SPHERICAL ABERRATION AT THE WIDE ANGLE END
PUPIL DIAMETER 2.0 mm

ASTIGMATISM AT THE WIDE ANGLE END

DISTORTION(%) AT THE WIDE ANGLE END

SPHERICAL ABERRATION AT THE TELEPHOTO END
PUPIL DIAMETER 2.0 mm

ASTIGMATISM AT THE TELEPHOTO END

DISTORTION(%) AT THE TELEPHOTO END

REAL-IMAGE VARIABLE-MAGNIFICATION VIEWFINDER

This application is based on Japanese Patent Application No. 2000-83247, filed on Mar. 21, 2000, the contents of which are hereby incorporated by reference.

BACKGROUND OF THE INVENTION

1. Field of the Invention

The present invention relates to a real-image variable-magnification viewfinder, and more particularly to a real-image variable-magnification viewfinder that offers a high zoom ratio and is suitable for use in a digital camera.

2. Description of Prior Art

As image-sensing devices such as CCDs (charge-coupled devices) for use in digital cameras become smaller and smaller, there has been an increasingly greater demand for compact high-zoom-ratio real-image viewfinders. However, most conventional real-image variable-magnification viewfinders offer zoom ratios of 3x or lower, and those offering zoom ratios over 3x are large. For example, the real-image variable-magnification viewfinder proposed in Japanese Patent Application Laid-Open No. H6-102453 has an objective optical system composed of, from the object side, a positive lens unit, a negative lens unit, a positive lens unit, and a fourth lens unit including at least one negative lens element. However, this viewfinder offers a zoom ratio of only about 2x and lower. The real-image variable-magnification viewfinder proposed in U.S. Pat. No. 5,225,927 has an objective optical system composed of, from the object side, a positive lens unit, a negative lens unit, a positive lens unit, and a fourth lens unit that has a weak optical power. However, this viewfinder, too, offers a zoom ratio of up to about 2.5x to 3.5x, and is, in addition, large.

The real-image variable-magnification viewfinder proposed in U.S. Pat. No. 5,694,244 has an objective optical system composed of, from the object side, a positive lens unit, a negative lens unit, and a positive lens unit. This viewfinder offers a zoom ratio over 3x, but is large. The real-image variable-magnification viewfinder proposed in U.S. Pat. No. 6,035,145 has an objective optical system composed of four lens units arranged in the following order, from the object side, a positive lens unit, a negative lens unit, a positive lens unit, and a negative lens unit. This viewfinder achieves zooming from the wide-angle end to the telephoto end by moving the second lens unit toward the image-plane side and moving the third lens unit monotonically toward the object side. This viewfinder offers a zoom ratio of up to about 4x, but is rather large.

As proposed in Japanese Patent Application Laid-Open No. H6-102453 and U.S. Pat. No. 5,225,927 mentioned above, in conventional real-image variable-magnification viewfinders having an objective optical system starting with a positive lens unit, a negative lens unit, and a positive lens unit, zoom solutions are commonly designed so that the second lens unit is almost solely responsible for zooming. Such zoom solutions, however, inevitably require a long movement distance in the second lens unit and a high power in the third lens unit. As a result, large aberration is caused by the third lens unit and large variations occur in the aberration caused by the second lens unit as zooming is performed. This makes miniaturization of such viewfinders impossible. On the other hand, giving the second and third lens units approximately equal shares of the overall zoom ratio as proposed in U.S. Pat. Nos. 5,694,244 and 6,035,145, mentioned above, helps miniaturize such viewfinders, but only to an insufficient degree.

SUMMARY OF THE INVENTION

An object of the present invention is to provide a real-image variable-magnification viewfinder that, despite having a high zoom ratio of over 3x, is compact and offers satisfactory optical performance.

To achieve the above object according to one aspect of the present invention, a real-image variable-magnification viewfinder is provided with: an objective optical system having a positive optical power for forming a real image in an optical path; an eyepiece optical system having a positive optical power for transmitting the real image formed by the objective optical system to a pupil of an observer; and an erecting optical system disposed in the optical path for inverting the real image formed by the objective optical system. The objective optical system is provided with three lens units arranged in the following order, from the object side; a first lens unit having a positive optical power; a second lens unit having a negative optical power; and a third lens unit having a positive optical power. In this viewfinder, as zooming is performed from the wide-angle end to the telephoto end, at least one of the second and third lens units are moved in such a way that the second and third lens units come closer to each other. In addition, the following conditional formulae are fulfilled:

$$-0.75 < m_{2W} < -0.3$$

$$-2 < m_{2T} < 1.05$$

$$-0.75 < m_{3W} < -0.3$$

$$-2 < m_{3T} < -1.05$$

$$L_2 > L_3$$

where $m_{2W}$ represents the lateral magnification of the second lens unit at the wide-angle end;

$m_{2T}$ represents the lateral magnification of the second lens unit at the telephoto end;

$m_{3W}$ represents the lateral magnification of the third lens unit at the wide-angle end;

$m_{3T}$ represents the lateral magnification of the third lens unit at the telephoto end;

$L_2$ represents the movement distance of the second lens unit over the entire zoom range; and $L_3$ represents the movement distance of the third lens unit over the entire zoom range.

According to another aspect of the present invention, a real-image variable-magnification viewfinder is provided with an objective optical system having a positive optical power for forming a real image in an optical path; an eyepiece optical system having a positive optical power for transmitting the real image formed by the objective optical system to a pupil of an observer; and an erecting optical system disposed in the optical path for inverting the real image formed by the objective optical system. The objective optical system is provided with four lens units arranged in the following order, from the object side; a first lens unit having a positive optical power; a second lens unit having a negative optical power; a third lens unit having a positive optical power; and a fourth lens unit. In this viewfinder, as zooming is performed from the wide-angle end to the telephoto end, at least one of the second and third lens units are moved in such a way that the second and third lens units come closer to each other. In addition, the following conditional formulae are fulfilled:

$$-0.75 < m_{2W} < -0.3$$

$$-2 < m_{2T} < -1.05$$

$$-0.75 < m_{3W} < -0.3$$

$$-2 < m_{3T} < -1.05$$

$$L_2 > L_3$$

$$-0.1 < PW_4 < 0.04$$

where $m_{2W}$ represents the lateral magnification of the second lens unit at the wide-angle end;

$m_{2T}$ represents the lateral magnification of the second lens unit at the telephoto end;

$m_{3W}$ represents the lateral magnification of the third lens unit at the wide-angle end;

$m_{3T}$ represents the lateral magnification of the third lens unit at the telephoto end;

$L_2$ represents the movement distance of the second lens unit over the entire zoom range;

$L_3$ represents the movement distance of the third lens unit over the entire zoom range; and $PW_4$ represents the optical power (mm$^{-1}$) of the fourth lens unit.

According to another aspect of the present invention, a real-image variable-magnification viewfinder is provided with: an objective optical system having a positive optical power for forming a real image in an optical path; an eyepiece optical system having a positive optical power for transmitting the real image formed by the objective optical system to a pupil of an observer; and an erecting optical system disposed in the optical path for inverting the real image formed by the objective optical system. The objective optical system is provided with four lens units arranged in the following order, from the object side: a first lens unit having a positive optical power; a second lens unit having a negative optical power; a third lens unit having a positive optical power; and a fourth lens unit having a negative optical power. In this viewfinder, as zooming is performed, the first, second, and third lens units are moved. In addition, the following conditional formulae are fulfilled:

$$-0.95 < m_{2W} < -0.3$$

$$-3 < m_{2T} < -1.05$$

$$-0.95 < m_{34W} < -0.3$$

$$-2.6 < m_{34T} < -1.05$$

where $m_{2W}$ represents the lateral magnification of the second lens unit at the wide-angle end;

$m_{2T}$ represents the lateral magnification of the second lens unit at the telephoto end;

$m_{34W}$ represents the composite lateral magnification of the third and fourth lens units at the wide-angle end; and $m_{34T}$ represents the composite lateral magnification of the third and fourth lens units at the telephoto end.

According to another aspect of the present invention, a real-image variable-magnification viewfinder is provided with: an objective optical system having a positive optical power for forming a real image in an optical path; an eyepiece optical system having a positive optical power for transmitting the real image formed by the objective optical system to a pupil of an observer; and an erecting optical system disposed in the optical path for inverting the real image formed by the objective optical system. The objective optical system is provided with at least three lens units arranged in the following order, from the object side: a first lens unit, and at least two succeeding lens units. In this viewfinder, the first lens unit is moved for adjustment of dioptric power, and zooming is achieved by moving at least two of the succeeding lens units in such a way that magnification is variable within a range extending to both sides of unity magnification.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1A:
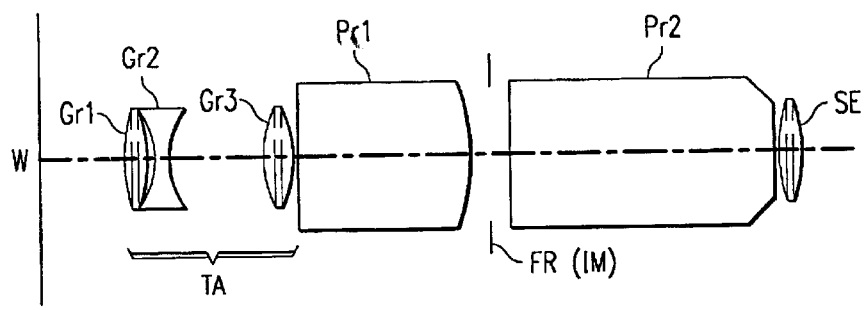
FIGS. 1A and 1B are lens arrangement diagrams of a first embodiment (Example 1) of the invention.
Figure 1B:
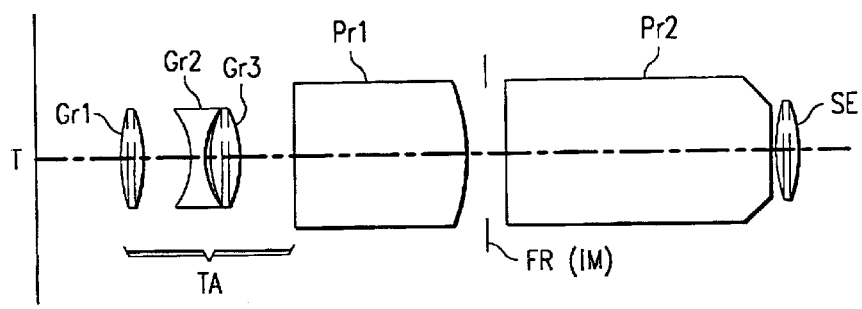
Figure 2A:
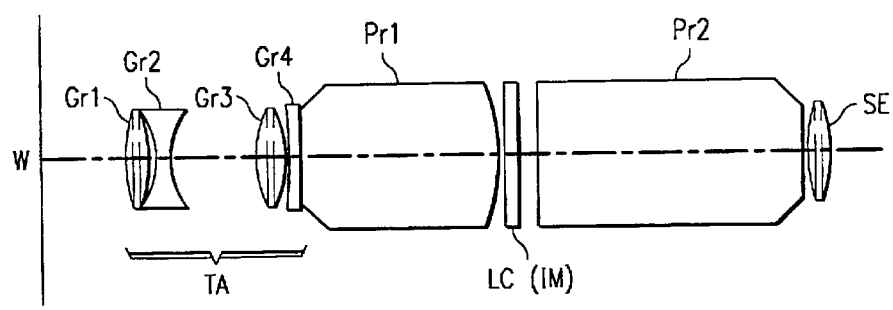
FIGS. 2A and 2B are lens arrangement diagrams of a second embodiment (Example 2) of the invention.
Figure 2B:
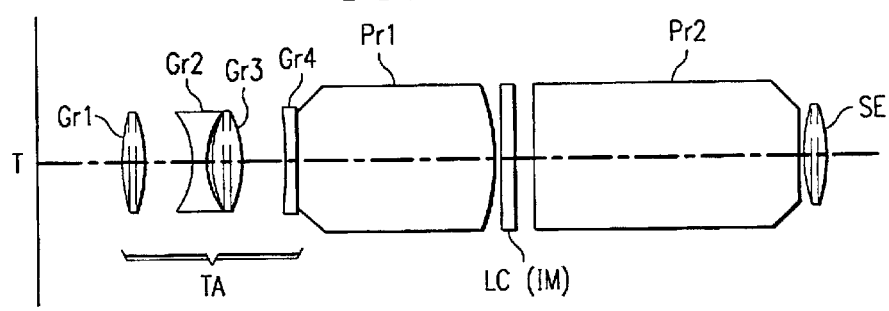
Figure 3A:
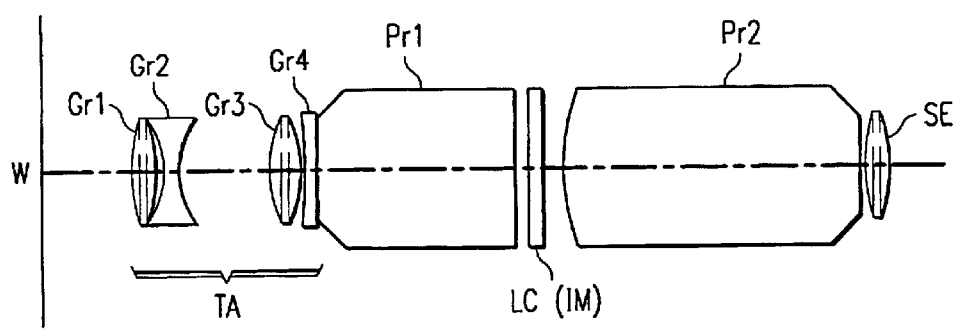
FIGS. 3A and 3B are lens arrangement diagrams of a third embodiment (Example 3) of the invention.
Figure 3B:
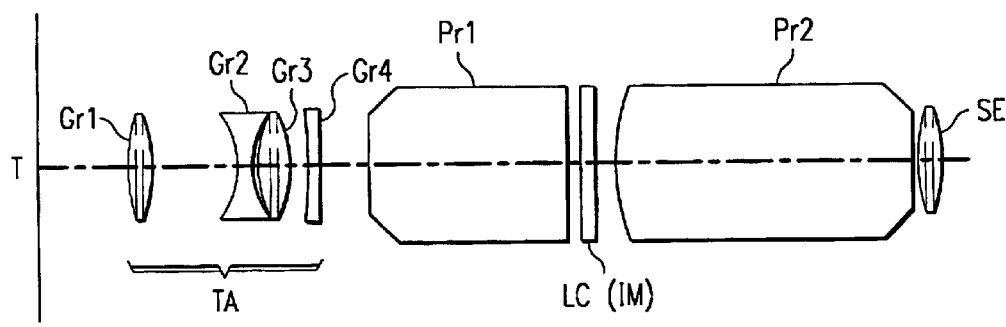

Hereinafter, real-image variable-magnification viewfinders embodying the present invention will be described with reference to the drawings. FIGS. 1A and 1B show the lens arrangement of the real-image variable-magnification viewfinder of a first embodiment at the wide-angle end W and at the telephoto end T, respectively. FIGS. 2A and 2B show the lens arrangement of the real-image variable-magnification viewfinder of a second embodiment at the wide-angle end W and at the telephoto end T, respectively. FIGS. 3A and 3B show the lens arrangement of the real-image variable-magnification viewfinder of a third embodiment at the wide-angle end W and at the telephoto end T, respectively. The real-image variable-magnification viewfinder of each of these embodiments is designed as a real-image zoom viewfinder that is to be provided separately from a shooting optical system, and they each have at least an objective optical system TA having a positive optical power, an eyepiece optical system SE having a positive optical power, and an erecting optical system composed of two prisms Pr1, Pr2. Here, it is to be noted that the optical powers of those surfaces whose distances from the objective image plane IM, as converted into aerial distances, are shorter than or equal to ¼ of the focal length of the eyepiece optical system SE, are used mainly to function as a condenser, and therefore those surfaces are not regarded as part of the objective optical system TA.

In the first embodiment (FIGS. 1A and 1B), the objective optical system TA is composed of, from the object side, a first lens unit Gr1 having a positive optical power, a second lens unit Gr2 having a negative optical power, and a third lens unit Gr3 having a positive optical power. As zooming is performed from the wide-angle end W to the telephoto end T, the second and third lens units Gr2, Gr3 are moved in such a way that they come closer to each other. The lens units Gr1 to Gr3 constituting the objective optical system TA are each composed of a single lens element, and the eyepiece optical system SE is also composed of a single lens element. The object-side prism Pr1 of the erecting optical system has its objective image plane IM side surface formed into a condenser lens surface, and a field-of-view frame FR is disposed at the objective image plane IM. In the first embodiment, the second and third lens units Gr2, Gr3, as movable lens units, contribute to zooming, and zooming is achieved by moving those lens units in such a way that magnification is variable within a range extending to both sides of unity magnification.

In the second embodiment (FIGS. 2A and 2B), the objective optical system TA is composed of, from the object side, a first lens unit Gr1 having a positive optical power, a second lens unit Gr2 having a negative optical power, a third lens unit Gr3 having a positive optical power, and a fourth lens unit Gr4 having a negative optical power. As zooming is performed from the wide-angle end W to the telephoto end T, the second and third lens units Gr2, Gr3 are moved in such a way that they come closer to each other. The lens units Gr1 to Gr4 constituting the objective optical system TA are each composed of a single lens element, and the eyepiece optical system SE is also composed of a single lens element. The object-side prism Pr1 of the erecting optical system has its objective image plane IM side surface formed into a condenser lens surface, and a liquid crystal display panel LC is disposed at the objective image plane IM. In the second embodiment, the second and third lens units Gr2, Gr3, as movable lens units, contribute to zooming, and zooming is achieved by moving those lens units in such a way that magnification is variable within a range extending to both sides of unity magnification.

In the third embodiment (FIGS. 3A and 3B), the objective optical system TA is composed of, from the object side, a first lens unit Gr1 having a positive optical power, a second lens unit Gr2 having a negative optical power, a third lens unit Gr3 having a positive optical power, and a fourth lens unit Gr4 having a negative optical power. As zooming is performed, the second, third, and fourth lens units Gr2, Gr3, Gr4 are moved. The lens units Gr1 to Gr4 constituting the objective optical system TA are each composed of a single lens element, and the eyepiece optical system SE is also composed of a single lens element. The pupil-side prism Pr2 of the erecting optical system has its objective image plane IM side surface formed into a condenser lens surface, and a liquid crystal display panel LC is disposed at the objective image plane IM. In the third embodiment, the second lens unit Gr2, as one movable lens unit, and the composite lens unit consisting of the third and fourth lens units Gr3, Gr4, as another movable lens unit, contribute to zooming, and zooming is achieved by moving those lens units in such a way that magnification is variable within a range extending to both sides of unity magnification. Here, the inclusion of the fourth lens unit Gr4 in the movable lens units helps increase flexibility in lens arrangement and thereby contributes to miniaturization of the entire viewfinder.

In a real-image variable-magnification viewfinder, like that of the first embodiment (FIGS. 1A and 1B), that includes an objective optical system TA having a positive optical power and composed of a positive, a negative, and a positive lens unit Gr1 to Gr3 and that achieves zooming from the wide-angle end W to the telephoto end T by moving the second and third lens units Gr2, Gr3 in such a way that they come closer to each other, it is preferable that conditional formulae (1) to (5) below be fulfilled. In a real-image variable-magnification viewfinder, like that of the second embodiment (FIGS. 2A and 2B), that includes an objective optical system TA having a positive optical power and composed of a positive lens unit, a negative lens unit, a positive lens unit Gr1 to Gr3 and, in addition, a fourth lens unit Gr4 and that achieves zooming from the wide-angle end W to the telephoto end T by moving the second and third lens units Gr2, Gr3 in such a way that they come closer to each other, it is preferable that conditional formulae (1) to (6) below be fulfilled.

$$-0.75 < m_{2W} < -0.3 \tag{1}$$

$$-2 < m_{2T} < -1.05 \tag{2}$$

$$-0.75 < m_{3W} < -0.3 \tag{3}$$

$$-2 < m_{3T} < -1.05 \tag{4}$$

$$L_2 > L_3 \tag{5}$$

$$-0.1 < PW_4 < 0.04 \tag{6}$$

where
  $m_{2W}$ represents the lateral magnification of the second lens unit Gr2 at the wide-angle end W;
  $m_{2T}$ represents the lateral magnification of the second lens unit Gr2 at the telephoto end T;

$m_{3W}$ represents the lateral magnification of the third lens unit Gr3 at the wide-angle end W;

$m_{3T}$ represents the lateral magnification of the third lens unit Gr3 at the telephoto end T;

$L_2$ represents the movement distance of the second lens unit Gr2 over the entire zoom range;

$L_3$ represents the movement distance of the third lens unit Gr3 over the entire zoom range; and $PW_4$ represents the optical power ($mm^{-1}$) of the fourth lens unit Gr4.

If the upper limit of conditional formula (1) were to be transgressed, almost only the second lens unit Gr2 would be responsible for zooming, and, if the lower limit of conditional formula (1) were to be transgressed, it would be impossible to secure a satisfactorily high zoom ratio. If the upper limit of conditional formula (2) were to be transgressed, almost only the second lens unit Gr2 would be responsible for zooming, and, if the lower limit of conditional formula (2) were to be transgressed, lens movement would cause too large a variation in aberration. If the upper limit of conditional formula (3) were to be transgressed, lens movement would cause too large a variation in aberration, and, if the lower limit of conditional formula (3) were to be transgressed, it would be impossible to secure a satisfactorily high zoom ratio. If the upper limit of conditional formula (4) were to be transgressed, almost only the second lens unit Gr2 would be responsible for zooming, and, if the lower limit of conditional formula (4) were to be transgressed, lens movement would cause too large a variation in aberration. If the upper limit of conditional formula (6) were to be transgressed, the viewfinder magnification would be too low, and, if the lower limit of conditional formula (6) were to be transgressed, the fourth lens unit Gr4 would cause such a large aberration that it would be impossible to obtain satisfactory optical performance.

Conditional formula (5) dictates that the movement distance of the second lens unit Gr2 be longer than that of the third lens unit Gr3. By making both these lens units Gr2, Gr3 contributory to zooming in the high-magnification portion of the zoom range, including the zoom position where magnification is equal to unity, and making the movement distance of the second lens unit Gr2 longer than that of the third lens unit Gr3, it is possible to make the zoom ratio of the second lens unit Gr2 contributory by an adequate factor to zooming of the entire viewfinder. This helps achieve a high zoom ratio and miniaturization. The reason will be explained in detail below with reference to FIG. 10.

Let the lateral magnification of a given lens unit be $\beta$. As the second and third lens units Gr2, Gr3 are moved, their respective conjugate distances $D_2$ and $D_3$ vary in the following ways:

As the second lens unit Gr2 is moved, the distance from an object point to the second lens unit Gr2 varies by the same amount as does the distance that the second lens unit Gr2 travels. Thus, the conjugate distance $D_2$ of the second lens unit Gr2 varies by a greater amount when $|\beta|>1$ than when $|\beta|<1$.

As the third lens unit Cr3 is moved, the distance from an image point to the third lens unit Gr3 varies by the same amount as does the distance that the third lens unit Gr3 travels. Thus, the conjugate distance $D_3$ of the third lens unit Gr3 varies by a greater amount when $|\beta|<1$ than when $|\beta|>1$.

On the other hand, to achieve image formation in the desired position, it is necessary to make the conjugate distances $D_2$ and $D_3$ of the second and third lens units Gr2, Gr3 vary by identical amounts. Accordingly, in arrangements where the movement distance of the second lens unit Gr2 is supposed to be longer than that of the third lens unit Gr3, the zoom position where the values of $|\beta|$ for both the second and third lens units Gr2, Gr3 are equal to unity magnification needs to be shifted toward the telephoto side from the middle position. Here, the middle position is a zoom position where the equation $f_t/f_m = f_m/f_w$ (where $f_m$ represents the objective focal length in the middle position) is fulfilled.

Figure 10:
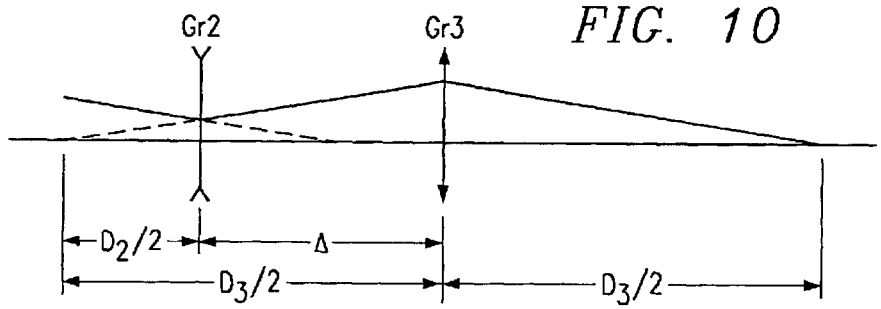
FIG. 10 is a diagram schematically illustrating the relationship between the movement distances of the second and third lens units and the zoom ratio.

The interval between the second and third lens units Gr2, Gr3 becomes shorter as they are moved toward the telephoto side. Therefore, in the zoom position where both the second and third lens units Gr2, Gr3 are at unity magnification, the interval between them is short (proposition (i)). Moreover, in this zoom position where the two lens units are at unity magnification, as shown in FIG. 10, the relation $D_3/2 = (D_2/2) + \Delta$ (where $\Delta$ represents the unit-to-unit interval) holds. Thus, as expressed by the equation $D_3 = D_2 + (2 \times \Delta)$, the conjugate distance $D_3$ of the third lens unit Gr3 is longer than the conjugate distance $D_2$ of the second lens unit by twice the unit-to-unit interval $\Delta$. Moreover, on the basis of the relation $D/f = 2 - (\beta + 1/\beta)$ (where D represents the conjugate distance and f represents the focal length), when $\beta = -1$, then $f = D/4$. Hence, the relation $D_3/4 = D_2/4 + (\Delta/2)$ holds. Thus, as expressed by the equation $f_3 = f_2 + (\Delta/2)$, the focal length, $f_3$, of the third lens unit Gr3 is longer than the focal length, $f_2$, of the second lens unit Gr2 by half the unit-to-unit interval $\Delta$ (proposition (ii)). Moreover, as zooming is performed, unless the conjugate distances $D_2$ and $D_3$ of the second and third lens units Gr2, Gr3 are made to vary by identical amounts, the image formation position shifts and causes variation in dioptric power. Thus, on the basis of the relation $D/f = 2 - (\beta + 1/\beta)$, when those lens units are moved so that their respective conjugate distances $D_2$ and $D_3$ vary by identical amounts, the longer the focal length of a lens unit, the smaller the amount by which the value of $\beta$ for that lens unit varies (proposition (iii)).

By making the movement distance of the second lens unit Gr2 longer than that of the third lens unit Gr3, it is possible to make shorter the interval between the second and third lens units Gr2, Gr3 when the values of $\beta$ for them are both equal to unity magnification (see proposition (i)). This makes the difference between the focal lengths of the second and third lens units Gr2, Gr3 smaller (see proposition (ii)), and thus makes the difference between the zoom ratios of the second and third lens units Gr2, Gr3 smaller (see proposition (iii)). In this way, by making the movement distance of the second lens unit Gr2 longer than that of the third lens unit Gr3, it is possible to make the zoom ratios of the second and third lens units Gr2, Gr3 closer to each other.

If one of these two lens units contributes to zooming by a disproportionately high factor, large variation occurs in the aberration caused by that lens unit during zooming. This makes it difficult to obtain a high zoom ratio, and any attempt to avoid that by correcting such aberration makes the viewfinder larger. By contrast, as described above, if conditional formula (5) is fulfilled, the zoom ratios of the second and third lens units Gr2, Gr3 become sufficiently close to each other, and thus the variation in the aberration caused by those lens units as they are moved become sufficiently small. This makes it possible to achieve a high zoom ratio and miniaturization simultaneously.

In the first embodiment, in a portion of the zoom range, the second lens unit Gr2 is kept stationary, and the third lens unit Gr3 is moved alone. In the second embodiment, in a portion of the zoom range, the third lens unit Gr3 is kept stationary, and the second lens unit Gr2 is moved alone. It is preferable that, in this way, in a portion of the zoom range, one of the second and third lens units Gr2, Gr3 be kept stationary and the other be moved alone. The reason will be explained in detail below.

For example, in the first embodiment, relative to the solution in the position where the lateral magnification is $\beta = -1$ for both the second and third lens units Gr2, Gr3, at the wide-angle end W, the value of $|\beta|$ is greater for the second lens unit Gr2 and smaller for the third lens unit Gr3. That is, the third lens unit Gr3 is farther apart from unity magnification. Because of this difference in the value of $\beta$ at the wide-angle end W, during zooming from the wide-angle end W to the telephoto end T, even when a position is reached where for the second lens unit Gr2 $\beta = -1$, for the third lens unit Gr3 still $\beta > -1$. Let the value of $\beta$ for the third lens unit Gr3 in this position be $\beta_{3m}$. From this position to the position where $\beta = 1/\beta_{3m}$ for the third lens unit Gr3, the third lens unit Gr3 is moved alone. In this portion of the zoom range, the value of $\beta$ for the third lens unit Gr3 remains approximately equal to $-1$, and therefore, even though the third lens unit Gr3 is moved alone, its conjugate distance shows almost no variation and thus causes almost no variation in dioptric power. This will be clear from the relation $D/f = 2 - (\beta + 1/\beta)$. In the remaining portion of the zoom range, zooming is achieved again by moving both the second and third lens units Gr2, Gr3. In this way, by securing a portion within the zoom range where zooming is achieved by the movement of the third lens unit Gr3 alone, it is possible to further reduce variation in aberration.

In a real-image variable-magnification viewfinder, like that of the third embodiment (FIGS. 3A and 3B), that includes an objective optical system TA having a positive optical power and composed of a positive lens unit, a negative lens unit, a positive lens unit, and a negative lens unit Gr1 to Gr4 and that achieves zooming by moving the second, third, and fourth lens units Gr2 to Gr4, it is preferable that conditional formulae (7) to (10) below be fulfilled.

$$-0.95 < m_{2W} < -0.3 \quad (7)$$

$$-3 < m_{2T} < -1.05 \quad (8)$$

$$-0.95 < m_{34W} < -0.3 \quad (9)$$

$$-2.6 < m_{34T} < -1.05 \quad (10)$$

where $m_{2W}$ represents the lateral magnification of the second lens unit Gr2 at the wide-angle end W;

$m_{2T}$ represents the lateral magnification of the second lens unit Gr2 at the telephoto end T;

$m_{34W}$ represents the composite lateral magnification of the third and fourth lens units Gr3, Gr4 at the wide-angle end W; and $m_{34T}$ represents the composite lateral magnification of the third and fourth lens units Gr3, Gr4 at the telephoto end T.

If the upper limit of conditional formula (7) were to be transgressed, almost only the second lens unit Gr2 would be responsible for zooming, and, if the lower limit of conditional formula (7) were to be transgressed, it would be impossible to secure a satisfactorily high zoom ratio. If the upper limit of conditional formula (8) were to be transgressed, almost only the second lens unit Gr2 would be responsible for zooming, and, if the lower limit of conditional formula (8) were to be transgressed, lens movement would cause too large a variation in aberration. If the upper limit of conditional formula (9) were to be transgressed, lens movement would cause too large a variation in aberration, and, if the lower limit of conditional formula (9) were to be transgressed, it would be impossible to secure a satisfactorily high zoom ratio. If the upper limit of conditional formula (10) were to be transgressed, almost only the second lens unit Gr2 would be responsible for zooming, and, if the lower limit of conditional formula (10) were to be transgressed, lens movement would cause too large a variation in aberration.

In a real-image variable-magnification viewfinder where, as described above, conditional formulae (7) to (10) are fulfilled, it is preferable that conditional formula (11) below be additionally fulfilled. This conditional formula (11) defines the preferable range of the factor by which the zoom ratio of the second lens unit Gr2 contributes to zooming of the entire viewfinder.

$$M_f^{0.5} < M_2 < M_f^{0.8} \quad (11)$$

where $M_2$ represents the zoom ratio ($=m_{2T}/m_{2W}$) of the second lens unit (Gr2); and $M_f$ represents the zoom ratio of the entire viewfinder.

In a real-image variable-magnification viewfinder, like those of the first to third embodiments, that includes an objective optical system TA composed of a first lens unit Gr1 disposed at the object-side end and at least two succeeding lens units, it is preferable to adopt an arrangement in which the first lens unit Gr1 is moved along the optical axis for adjustment of dioptric power and zooming is achieved by moving two lens units other than the first lens unit Gr1 in such a way that magnification is variable within a range extending to both sides of unity magnification. The reason will be explained in detail below.

In an optical system, like those of the first to third embodiments, where zooming is achieved by moving movable lens units in such a way that magnification is variable within a range extending to both sides of unity magnification, quite naturally, the magnifications of those movable lens units are kept close to unity magnification over the entire zoom range. With their magnifications kept close to unity magnification in this way, those movable lens units, even when moved along the optical axis, show only a little variation in their conjugate distances and thus cause only a little variation in dioptric power. Thus, these movable lens units demand long movement distances, and, as a side effect thereof, if they are used for adjustment of dioptric power, they perform zooming simultaneously. Moreover, if these movable lens units are used for adjustment of dioptric power, dioptric power varies in opposite directions at the wide-angle end W and at the telephoto end T. Roughly speaking, errors in dioptric power are due to factors such as the surface finish, the positions along the optical axis, and the refractive indices of the constituent lens elements. All these factors cause errors in dioptric power in the same direction at the wide-angle end W and at the telephoto end T, except the positions of the lens elements constituting the above-mentioned movable lens units that are so moved that magnification is variable within a range extending to both sides of unity magnification. Thus, if dioptric power adjustment is attempted by varying the positions of these movable lens units that are so moved that magnification is variable within a range extending to both sides of unity magnification, with most factors causing errors in dioptric power, correcting them at one of the wide-angle end W and the telephoto end T results in aggravating them at the other. For this reason, the movable lens units are not suitable for dioptric power adjustment. On the other hand, it is also known to use the eyepiece optical system SE for dioptric power adjustment. However, if the eyepiece optical system SE is used for dioptric power adjustment, as the dioptric power of the entire viewfinder is adjusted, the dioptric power with respect to the AF (autofocus) frame disposed at the objective image plane IM also varies. For this reason, the eyepiece optical system SE, too, is not suitable for adjustment of the dioptric power of the objective optical system TA.

In a real-image variable-magnification viewfinder, like those of the first to third embodiments, where, as zooming is performed between the wide-angle end W and the telephoto end T, two lens units other than the first lens unit Gr1 are moved in such a way that magnification is variable within a range extending to both sides of unity magnification, the first lens unit Gr1 is given a higher optical power than in arrangements where zooming is achieved by moving the second lens unit Gr2 alone. Moreover, variation in dioptric power resulting from movement of the first lens unit Gr1 is proportional to the square of "the viewfinder magnification times the power of the first lens unit Gr1", and therefore effective correction of dioptric power is possible with a slight movement of the first lens unit Gr1. In addition, dioptric power varies in the same direction at the wide-angle end W and at the telephoto end T. For this reason, in an optical system, like those of the first to third embodiments, where zooming is achieved by moving the movable lens units in such a way that magnification is variable within a range extending to both sides of unity magnification, it is preferable to adjust dioptric power by moving the first lens unit Gr1 along the optical axis. This method helps minimize the movement distance that the lens unit needs to travel for adjustment, and thus permits dioptric power adjustment without sacrificing other optical performance or making the entire viewfinder larger.

PRACTICAL EXAMPLES

Hereinafter, practical examples of real-image variable-magnification viewfinders embodying the present invention are presented in more detail with reference to their construction data and other data. Examples 1 to 3 presented below correspond respectively to the first to third embodiments described hereinbefore, and FIGS. 1A and 1B, 2A and 2B, and 3A and 3B, which show the lens arrangements of the first to third embodiments, apply also to Examples 1 to 3, respectively.

Tables 1, 3, and 5 list the construction data and other data of Examples 1 to 3, respectively. In the construction data of each example, Si (i=1, 2, 3, . . .) represents the i-th surface from the object side among all the relevant surfaces on the optical elements constituting the individual lens units and optical systems, and there are listed the radius of curvature (mm) of each surface Si, the i-th axial distance (mm) from the object side, the refractive index (Ne) for the e-line of the i-th optical element from the object side, and the Abbe number (vd) of the i-th optical element from the object side. For each of those axial distances that vary with zooming (i.e., variable aerial distances), two values are given that are, from left, the axial distance at the wide-angle end W, i.e., the shortest-focal-length end, and the axial distance at the telephoto end T, i.e., the longest-focal-length end. Also listed are the half view angles ω (°) in those two end focal-length positions.

A surface Si marked with an asterisk (*) is an aspherical surface, of which the surface shape is defined by formula (AS) below. Tables 2, 4, and 6 list the aspherical surface data of Examples 1, 2, and 3, respectively.

$$X(H)=(C0 \cdot H^2)/(1+\sqrt{1-\epsilon \cdot C0^2 \cdot H^2}) + (A4 \cdot H^4 + A6 \cdot H^6 + A8 \cdot H^8 + A10 \cdot H^{10} + A12 \cdot H^{12}) \quad (AS)$$

where
- X(H) represents the displacement along the optical axis at the height H (relative to the vertex);
- H represents the height in a direction perpendicular to the optical axis;
- C0 represents the paraxial curvature (equals the reciprocal of the radius of curvature);
- ε represents the quadric surface parameter; and
- Ai represents the aspherical surface coefficient of i-th order.

Table 7 lists the values of the conditional formulae actually observed in Examples 1 to 3. Table 8 lists the variations in dioptric power (in diopters) observed at the wide-angle end W and at the telephoto end T when a lens unit is moved toward the object side by 0.1 mm. As will be clear from the data listed in Table 8, by moving the first lens unit Gr1 along the optical axis, it is possible to achieve effective correction of dioptric power with a slight movement of the lens unit, and, in this case, dioptric power varies in the same direction at the wide-angle end W and at telephoto end T.

Figure 4:
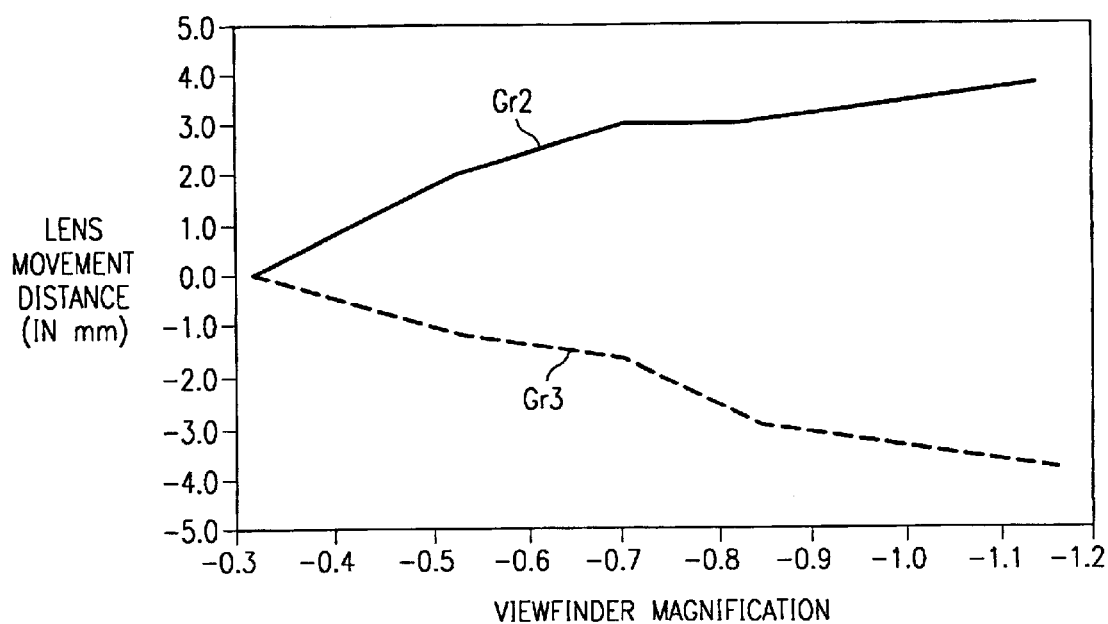
FIG. 4 is a diagram showing the relationship between the movement distances of the second and third lens units and the viewfinder magnification as zooming is performed in Example 1.
Figure 5:
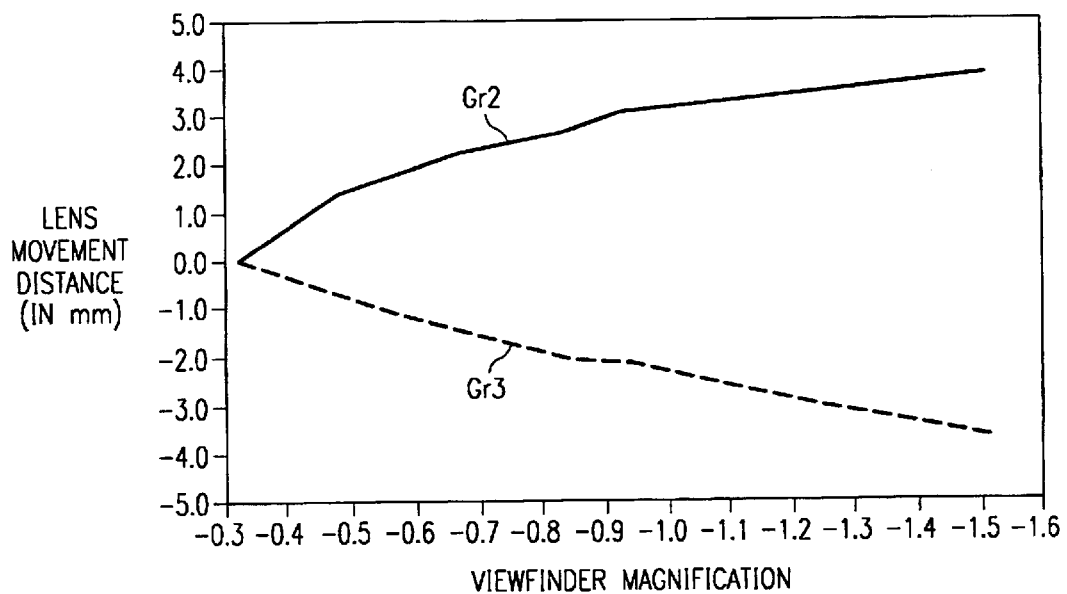
FIG. 5 is a diagram showing the relationship between the movement distances of the second and third lens units and the viewfinder magnification as zooming is performed in Example 2.
Figure 6:
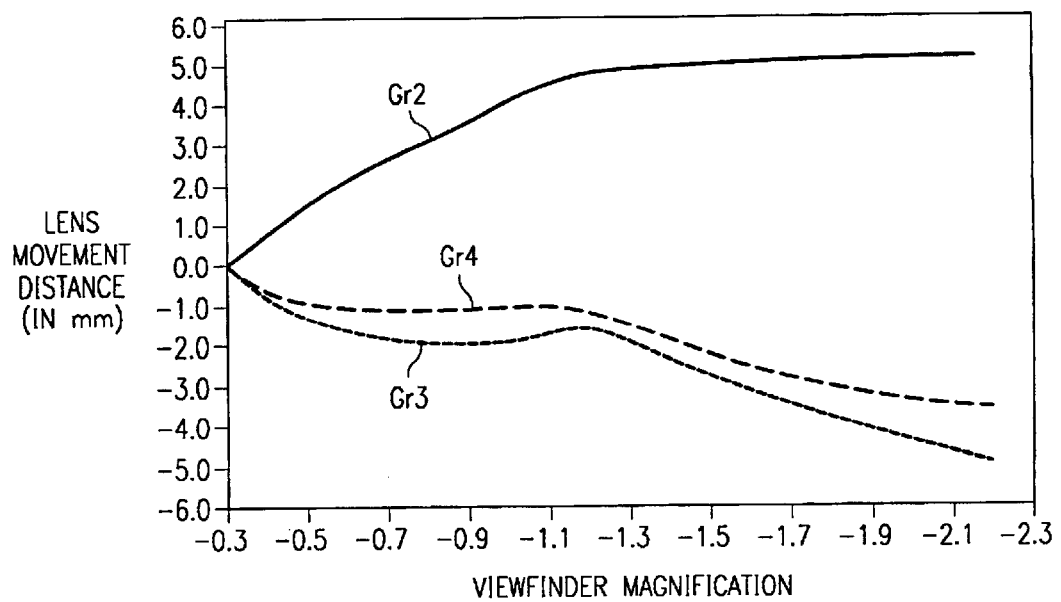
FIG. 6 is a diagram showing the relationship between the movement distances of the second, third and fourth lens units and the viewfinder magnification as zooming is performed in Example 3.
Figure 7A:
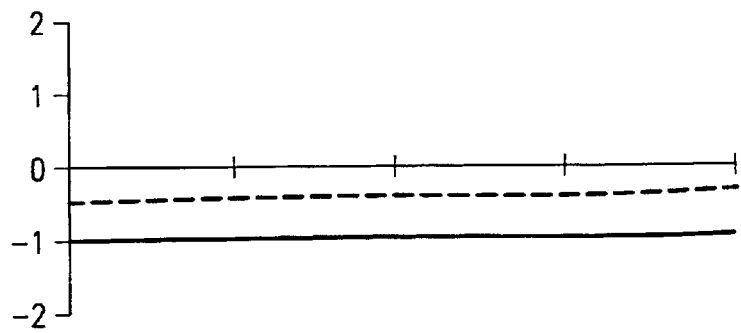
FIGS. 7A to 7F are aberration diagrams of Example 1.
Figure 7B:
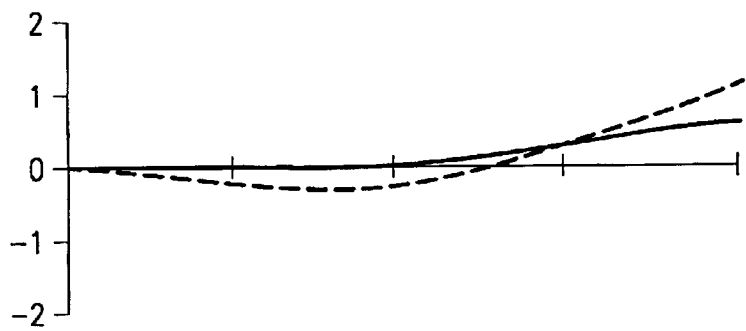
Figure 7C:
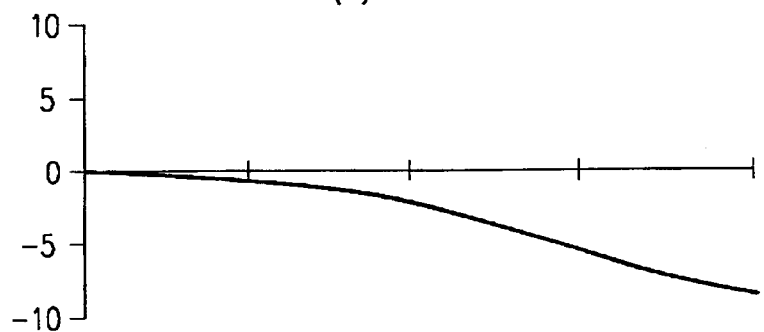
Figure 7D:
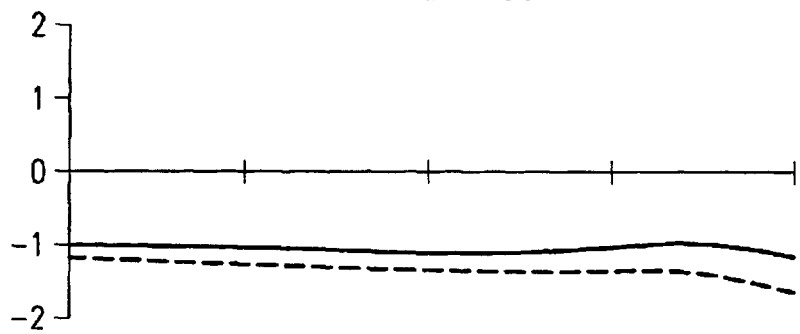
Figure 7E:
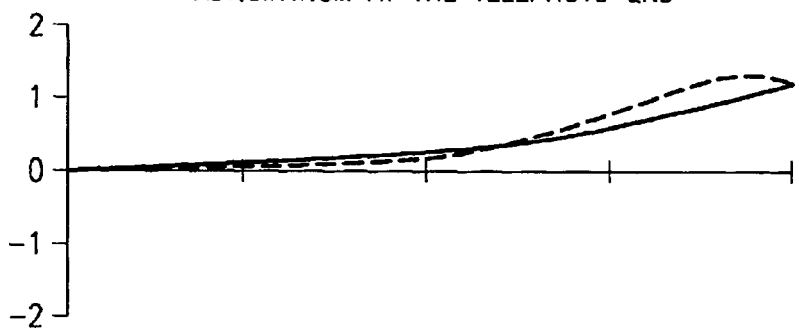
Figure 7F:
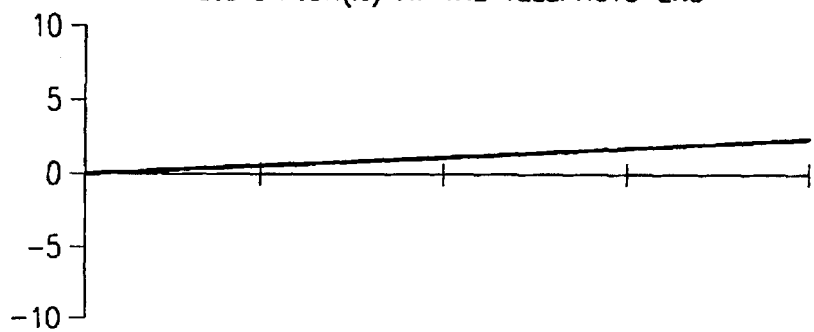
Figure 8A:
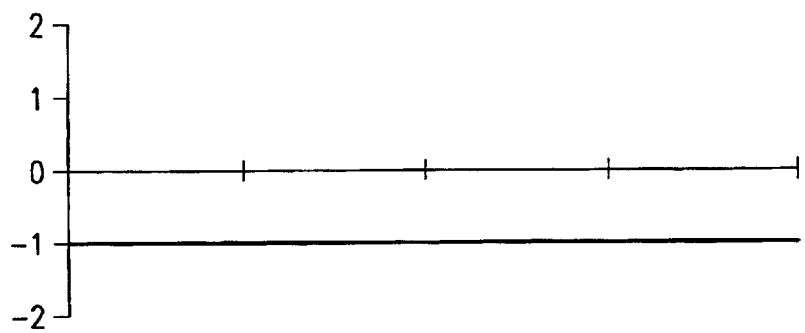
FIGS. 8A to 8F are aberration diagrams of Example 2.
Figure 8B:
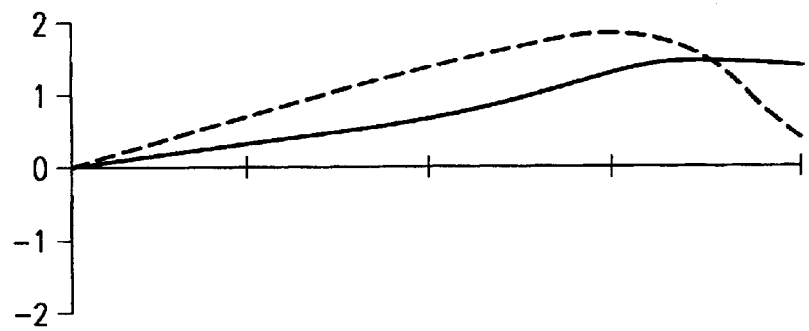
Figure 8C:
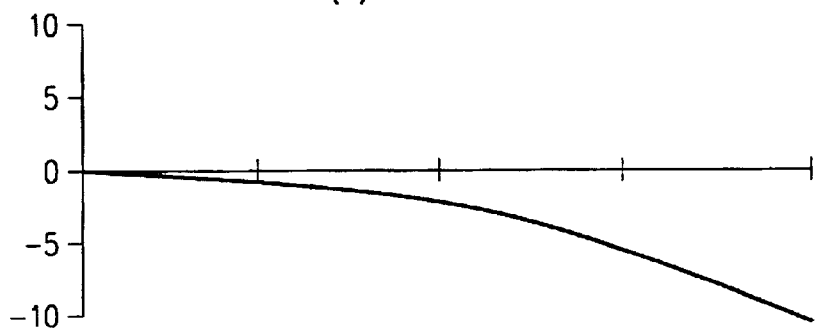
Figure 8D:
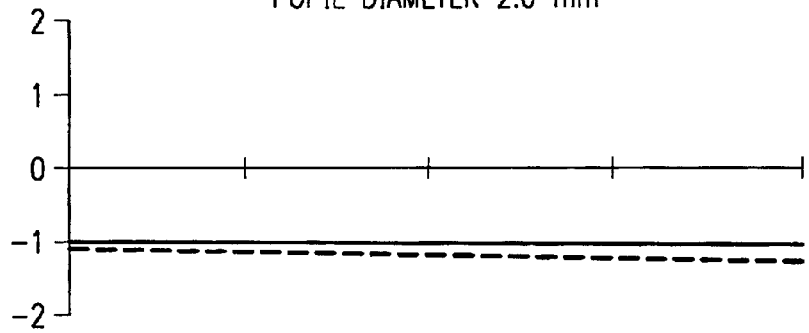
Figure 8E:
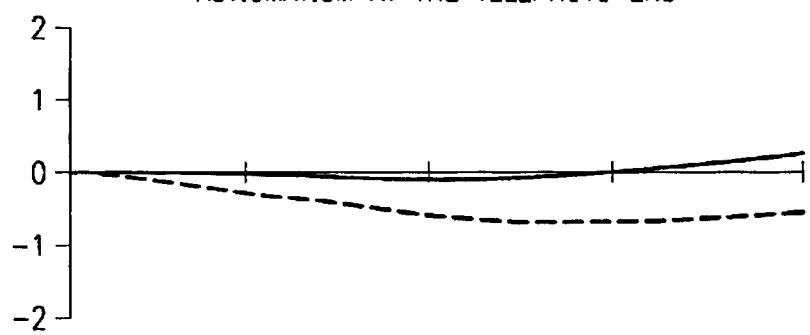
Figure 8F:
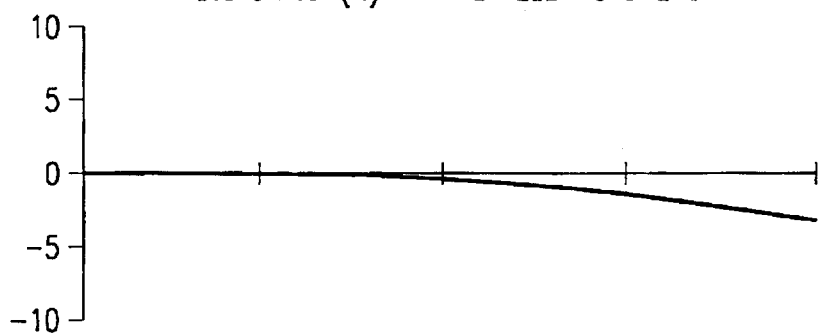
Figure 9A:
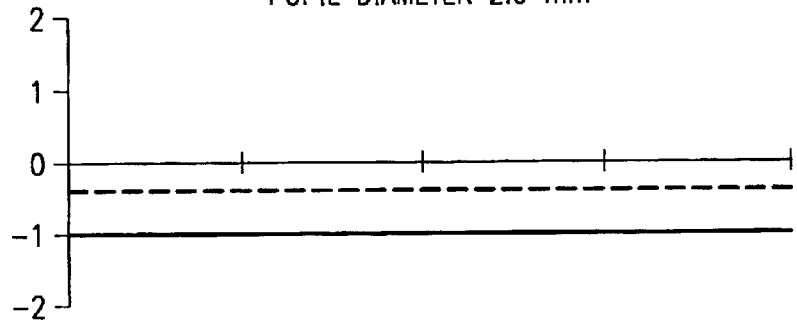
FIGS. 9A to 9F are aberration diagrams of Example 3.
Figure 9B:
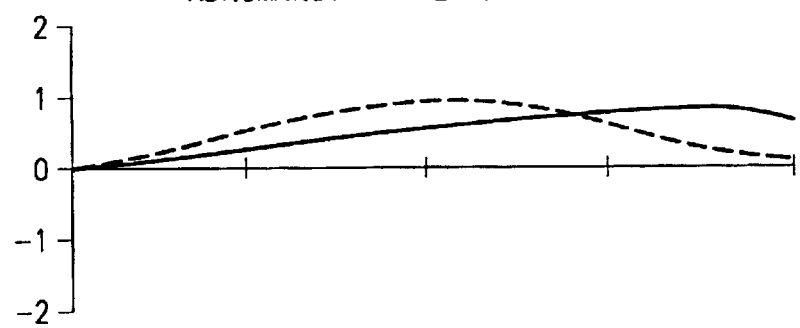
Figure 9C:
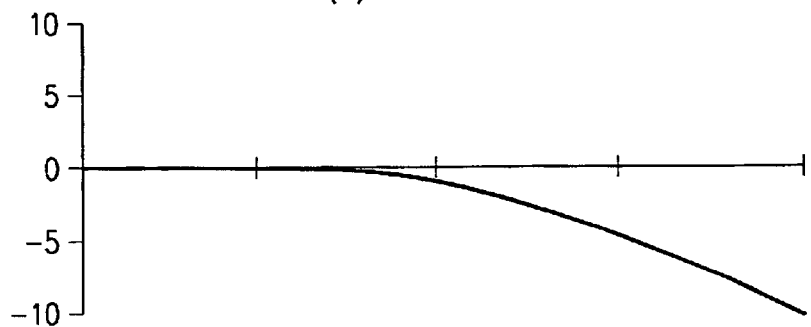
Figure 9D:
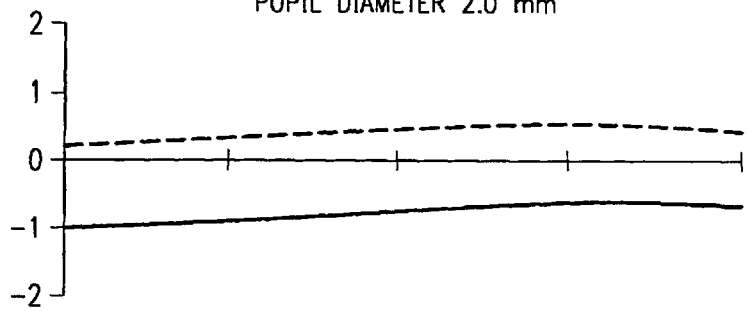
Figure 9E:
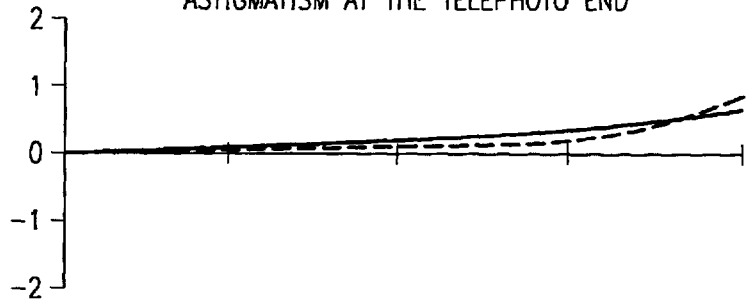
Figure 9F:
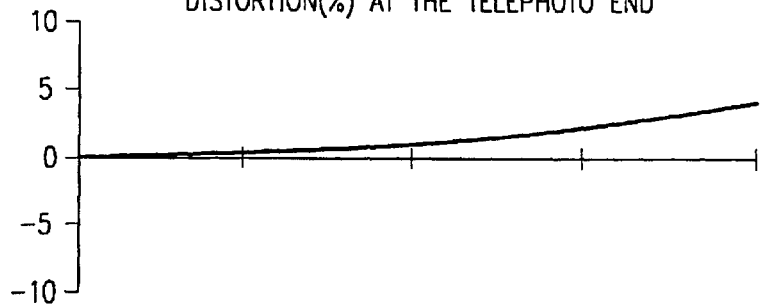

FIGS. 4 to 6 show the relationship between the movement distances (in mm) of the lens units and the viewfinder magnification as observed during zooming in Examples 1 to 3, respectively. A movement of a lens unit toward the object side (or toward the pupil side) is represented by a negative (or positive) value. The origin (where the movement distance equals 0 mm) of the graphs corresponds to the wide-angle end W. In these diagrams, a solid line represents the movement of the second lens unit Gr2, a fine broken line represents the movement of the third lens unit Gr3, and a coarse broken line represents the movement of the fourth lens unit Gr4. Here, special notice should be paid to the following portions of the graphs where a lens unit is kept stationary: in Example 1 (FIG. 4), the second lens unit Gr2 alone is kept stationary in a portion of the zoom range where the viewfinder magnification is from about −0.7× to −0.85×; in Example 2 (FIG. 5), the third lens unit Gr3 alone is kept stationary in a portion of the zoom range where the viewfinder magnification is around −0.9×.lens unit Gr4. Here, special notice should be paid to the following portions of the graphs where a lens unit is kept stationary: in Example 1 (FIG. 4), the second lens unit Gr2 alone is kept stationary in a portion of the zoom range where the viewfinder magnification is from about −0.7× to −0.85×; in Example 2 (FIG. 5), the third lens unit Gr3 alone is kept stationary in a portion of the zoom range where the viewfinder magnification is around −0.9×.

FIGS. 7A to 7F, 8A to 8F, and 9A to 9F are aberration diagrams of Examples 1 to 3, respectively. Of these diagrams, FIGS. 7A to 7C, 8A to 8C, and 9A to 9C show the aberration observed at the wide-angle end W, and FIGS. 7D to 7F, 8D to 8F, and 9D to 9F show the aberration observed at the telephoto end T. FIGS. 7A and 7D, 8A and 8D, and 9A and 9D show spherical aberration, FIGS. 7B and 7E, 8B and 8E, and 9B and 9E show astigmatism, and FIGS. 7C and 7F, 8C and 8F, and 9C and 9F show distortion. In the diagrams showing spherical aberration, a solid line and a broken line represent the spherical aberration (in diopters) for the e-line and for the g-line, respectively, with respect to the horizontal axis that represents the pupil radius =1.0 (mm). In the diagrams showing astigmatism, a broken line and a solid line represent the astigmatism (in diopters) for the e-line on the meridional plane and on the sagittal plane, respectively, with respect to the horizontal axis that represents the half view angle 0) in each end focal-length position. In the diagrams showing distortion, a solid line represents the distortion (%) for the e-line with respect to the horizontal axis that represents the half view angle $\omega(°)$ in each end focal-length position.

TABLE 1

Construction Data of Example 1
$\omega(°)$ = 31.2 to 8.4

| Component | | Surface | Radius of Curvature | Axial Distance W | T | Ne | vd |
|---|---|---|---|---|---|---|---|
| Objective Optical System (TA) | Gr1 | S1* | 45.5351 | | | | |
| | | | | 1.64494 | | 1.49329 | 57.82 |
| | | S2* | −7.61151 | | | | |
| | | | | 0.512219 | 4.3509 | 1 | — |
| | | S3* | −4.73792 | | | | |
| | Gr2 | | | 0.8 | | 1.5785 | 33 |
| | | S4* | 7.13068 | | | | |
| | | | | 8.11896 | 0.4914 | 1 | — |
| | | S5* | 9.4264 | | | | |
| | Gr3 | | | 2.41925 | | 1.5277 | 52.1 |
| | | S6* | −5.38355 | | | | |
| Erecting Optical System (Pr1) | | S7 | ∞ | 0.3 | 4.0889 | 1 | — |
| | | | | 15.0161 | | 1.5785 | 33 |
| | | S8 | −14.0665 | | | | |
| Field-of-View Frame | | S9 | ∞(FR,IM) | 0.992397 | | 1 | — |
| | | | | 1.8 | | 1 | — |
| Erecting Optical System (Pr2) | | S10 | ∞ | | | | |
| | | | | 21.8266 | | 1.58779 | 30.48 |
| | | S11 | ∞ | | | | |
| | | | | 0.4 | | 1 | — |
| Eyepiece Optical System | | S12 | 24.3347 | | | | |
| | | | | 1.7 | | 1.49329 | 57.82 |
| | | S13* | −12.5 | | | | |
| | | | | 11 | | 1 | — |
| Pupil | | S14 | ∞ | | | | |

TABLE 2

Aspherical Surface Data of Example 1

| Surface | ε | A4 | A6 | A8 | A10 | A12 |
|---|---|---|---|---|---|---|
| S1 | 98.6136 | 0 | 0 | 0 | 0 | 0 |
| S2 | −1.67774 | $4.1663 \times 10^{-4}$ | $2.1453 \times 10^{-6}$ | $-1.9471 \times 10^{-7}$ | $6.7431 \times 10^{-8}$ | 0 |
| S3 | −2.37369 | $1.4335 \times 10^{-4}$ | $-6.6388 \times 10^{-6}$ | $1.7666 \times 10^{-6}$ | $1.3881 \times 10^{-7}$ | 0 |
| S4 | −0.94118 | $-4.0269 \times 10^{-4}$ | $5.1167 \times 10^{-6}$ | $9.3353 \times 10^{-7}$ | 0 | 0 |
| S5 | 0.349837 | $-1.3146 \times 10^{-3}$ | $6.5408 \times 10^{-5}$ | $1.0424 \times 10^{-6}$ | 0 | 0 |
| S6 | −2.47553 | $-1.6285 \times 10^{-3}$ | $-4.8880 \times 10^{-6}$ | $5.4790 \times 10^{-6}$ | 0 | 0 |
| S13 | 1 | $1.8676 \times 10^{-5}$ | $1.3569 \times 10^{-5}$ | $-6.0222 \times 10^{-7}$ | $-9.1390 \times 10^{-9}$ | $4.7424 \times 10^{-10}$ |

TABLE 3

Construction Data of Example 2
$\omega(°)$ = 30.5 to 6.3

| Component | | Surface | Radius of Curvature | Axial Distance W | T | Ne | vd |
|---|---|---|---|---|---|---|---|
| Objective Optical System (TA) | Gr1 | S1* | 50.4722 | | | | |
| | | | | 1.4904 | | 1.49329 | 57.82 |
| | | S2* | −6.06833 | | | | |
| | | | | 0.404295 | 4.2334 | 1 | — |
| | | S3* | −4.89479 | | | | |
| | Gr2 | | | 0.8 | | 1.53799 | 39.7 |
| | | S4* | 4.10394 | | | | |
| | | | | 7.92638 | 0.4361 | 1 | — |
| | | S5* | 6.81608 | | | | |
| | Gr3 | | | 2.07892 | | 1.52438 | 52.2 |
| | | S6* | −4.8384 | | | | |
| | | | | 0.3 | 3.9612 | 1 | — |
| | | S7* | −18.5146 | | | | |
| | Gr4 | | | 0.8 | | 1.62627 | 24.01 |
| | | S8 | ∞ | | | | |
| Erecting Optical System (Pr1) | | | | 0.3 | | 1 | — |
| | | S9 | ∞ | | | | |
| | | | | 15.0526 | | 1.49329 | 57.82 |
| | | S10 | −9.54608 | | | | |
| | | | | 0.7 | | 1 | — |
| Liquid Crystal Display Panel (LC) | | S11 | ∞ | | | | |
| | | | | 0.45 | | 1.51872 | 64.2 |
| | | S12 | ∞(IM) | | | | |
| | | | | 0.45 | | 1.51872 | 64.2 |
| | | S13 | ∞ | | | | |
| Erecting Optical System (Pr2) | | | | 1.5 | | 1 | — |
| | | S14 | ∞ | | | | |
| | | | | 21 | | 1.49329 | 57.82 |
| | | S15 | ∞ | | | | |
| Eyepiece Optical System (SE) | | | | 0.3 | | 1 | — |
| | | S16 | 15.358 | | | | |
| | | | | 1.65 | | 1.49329 | 57.82 |
| | | S17* | −17.82 | | | | |
| | | | | 11 | | 1 | — |
| Pupil | | S18 | ∞ | | | | |

TABLE 4

Aspherical Surface Data of Example 2

| Surface | ϵ | A4 | A6 | A8 | A10 | A12 |
|---|---|---|---|---|---|---|
| S1 | 36.9215 | 0.00132865 | $-6.8853 \times 10^{-6}$ | $-3.7166 \times 10^{-7}$ | 0 | 0 |
| S2 | -3.34277 | 0.00105992 | $-4.2167 \times 10^{-6}$ | $-4.3285 \times 10^{-7}$ | 0 | 0 |
| S3 | 0.291771 | 0.00101481 | $1.5458 \times 10^{-5}$ | $1.3201 \times 10^{-5}$ | 0 | $6.0000 \times 10^{-9}$ |
| S4 | -4.61676 | 0.00037003 | $-7.5653 \times 10^{-5}$ | $1.9904 \times 10^{-5}$ | 0 | 0 |
| S5 | -4.63468 | 0.00217338 | $-4.8888 \times 10^{-5}$ | $4.1878 \times 10^{-6}$ | 0 | 0 |
| S6 | -1.9693 | 0.00010528 | $1.5443 \times 10^{-4}$ | $-6.2566 \times 10^{-6}$ | 0 | 0 |
| S7 | 4.74155 | 0.00070528 | $5.1159 \times 10^{-5}$ | $-9.7758 \times 10^{-6}$ | 0 | 0 |
| S17 | 1 | 0.00025143 | $-1.2508 \times 10^{-6}$ | $-5.0000 \times 10^{-8}$ | 0 | 0 |

TABLE 5

Construction Data of Example 3

ω(°) = 30.5 to 4.8

| Component | Surface | Radius of Curvature | Axial Distance W | Axial Distance T | Ne | vd |
|---|---|---|---|---|---|---|
| Objective | S1* | 18.3975 | | | | |
| Optical | | | 1.62583 | 1.49329 | 57.82 | |
| System | S2* | -9.20107 | | | | |
| (TA) | | | 0.558251 | 5.7047 | 1 | — |
| | S3* | -5.34791 | | | | |
| Gr2 | | | 0.8 | 1.53799 | 39.7 | |
| | S4* | 3.70432 | | | | |
| | | | 10.3544 | 0.5023 | 1 | — |
| | S5* | 6.44143 | | | | |
| Gr3 | | | 2.16149 | 1.52438 | 52.2 | |
| | S6* | -4.94325 | | | | |
| | | | 0.3 | 1.6144 | 1 | — |
| | S7* | -11.8998 | | | | |
| Gr4 | | | 0.8 | 1.62627 | 24.01 | |
| | S8 | ∞ | | | | |
| Erecting | | | 0.3 | 3.6912 | 1 | — |
| Optical | S9 | ∞ | | | | |
| System | | | 17.0012 | 1.58779 | 30.48 | |
| (Pr1) | S10 | ∞ | | | | |
| | | | 0.7 | | 1 | — |
| Liquid Crystal | S11 | ∞ | | | | |
| Display Panel | | | 0.45 | 1.51872 | 64.2 | |
| (LC) | S12 | ∞(IM) | | | | |
| | | | 0.45 | 1.51872 | 64.2 | |
| | S13 | ∞ | | | | |
| Erecting | | | 1.5 | | 1 | — |
| Optical | S14 | 9.7316 | | | | |
| System | | | 24.0334 | 1.49329 | 57.82 | |
| (Pr1) | S15 | ∞ | | | | |
| Eyepiece | | | 0.3 | | 1 | — |
| Optical | S16 | 12.3579 | | | | |
| System | | | 1.65 | 1.49329 | 57.82 | |
| (SE) | S17* | -37.4822 | | | | |
| | | | 11 | | 1 | — |
| Pupil | S18 | ∞ | | | | |

TABLE 6

Aspherical Surface Data of Example 3

| Surface | ϵ | A4 | A6 | A8 | A10 | A12 |
|---|---|---|---|---|---|---|
| S1 | 4.418 | 0.00030567 | $-1.8229 \times 10^{-5}$ | $4.9808 \times 10^{-7}$ | 0 | 0 |
| S2 | -3.74377 | 0.00046384 | $-2.4408 \times 10^{-5}$ | $6.3435 \times 10^{-7}$ | 0 | 0 |
| S3 | 0.123153 | -0.0001413 | $1.2927 \times 10^{-4}$ | $-3.9191 \times 10^{-6}$ | 0 | $6.00 \times 10^{-9}$ |
| S4 | -3.49987 | 0.00144005 | $-1.3152 \times 10^{-4}$ | $1.1902 \times 10^{-5}$ | 0 | 0 |
| S5 | -5.34506 | 0.00203638 | $8.8331 \times 10^{-7}$ | $8.2896 \times 10^{-7}$ | 0 | 0 |
| S6 | -2.20362 | -0.0009919 | $2.6123 \times 10^{-4}$ | $-1.2871 \times 10^{-5}$ | 0 | 0 |
| S7 | 3.33942 | 0.00039883 | $1.1145 \times 10^{-4}$ | $-1.3402 \times 10^{-5}$ | 0 | 0 |
| S17 | 1.4 | 0.00021716 | $2.4847 \times 10^{-6}$ | $-7.9278 \times 10^{-8}$ | 0 | 0 |

TABLE 7

Actual Values of Conditional Formulae

| Conditional | Formula | Example 1 | Example 2 | Example 3 |
|---|---|---|---|---|
| (1), (7) | $m_{2W}$ | −0.621 | −0.568 | −0.523 |
| (2), (8) | $m_{2T}$ | −1.228 | −1.345 | −1.632 |
| (3) | $m_{3W}$ | −0.666 | −0.633 | — |
| (4) | $m_{3T}$ | −1.214 | −1.269 | — |
| (5) | $I_2$ | 3.839 | 3.829 | — |
|  | $I_3$ | 3.789 | 3.661 | — |
| (6) | $PW_4$ | — | −0.034 | — |
| (9) | $m_{34W}$ | — | — | −0.807 |
| (10) | $m_{34T}$ | — | — | −1.673 |
| (11) | $M_2$ | — | — | 3.119 |
|  | $M_f^{0.5}$ | — | — | 2.550 |
|  | $M_f^{0.8}$ | — | — | 4.470 |

TABLE 8

Variations in Dioptric Power (in Diopters)

| Lens Unit Moved for Dioptric Power Adjustment | Example 1 | | Example 2 | | Example 3 | |
|---|---|---|---|---|---|---|
|  | T | W | T | W | T | W |
| First Lens Unit (Gr1) | 0.722 | 0.055 | 1.814 | 0.080 | 2.543 | 0.061 |
| Second Lens Unit (Gr2) | −0.255 | 0.086 | −0.834 | 0.165 | −1.604 | 0.158 |
| Third Lens Unit (Gr3) | −0.145 | 0.182 | −0.358 | 0.377 | 0.206 | 0.712 |
| Fourth Lens Unit (Gr4) | — | — | −0.305 | −0.305 | −0.803 | −0.591 |

What is claimed is:

1. A real-image variable-magnification viewfinder comprising:

an objective optical system, having a positive optical power, for forming a real image in an optical path;

an eyepiece optical system, having a positive optical power, for transmitting the real image formed by the objective optical system to a pupil of an observer; and an erecting optical system, disposed in the optical path, for inverting the real image formed by the objective optical system, wherein the objective optical system consists of three lens units arranged in the following order, from an object side of the objective optical system:

a first lens unit having a positive optical power;
a second lens unit having a negative optical power; and
a third lens unit having a positive optical power, wherein, as zooming is performed from a wide-angle end to a telephoto end, at least one of the second lens unit and third lens unit is moved in such a way that the second lens unit and third lens unit come closer to each other, and the following conditional formulae are fulfilled:

$-0.75 < m_{2W} < -0.3$ $-2 < m_{2T} < -1.05$ $-0.75 < m_{3W} < -0.3$ $-2 < m_{3T} < -1.05$ $L_2 > L_3$ where $m_{2W}$ represents a lateral magnification of the second lens unit at the wide-angle end;

$m_{2T}$ represents a lateral magnification of the second lens unit at the telephoto end;

$m_{3W}$ represents a lateral magnification of the third lens unit at the wide-angle end;

$m_{3T}$ represents a lateral magnification of the third lens unit at the telephoto end;

$L_2$ represents a movement distance of the second lens unit over an entire zoom range; and $L_3$ represents a movement distance of the third lens unit over the entire zoom range.

2. A real-image variable-magnification viewfinder as claimed in claim 1, wherein, when zooming is performed, the second lens unit is moved and the third lens unit is kept stationary.

3. A real-image variable-magnification viewfinder as claimed in claim 1, wherein in a portion of a zoom range, the second lens unit is kept stationary and the third lens unit is moved.

4. A real-image variable-magnification viewfinder as claimed in claim 1, wherein the erecting optical system comprises two prisms.

5. A real-image variable-magnification viewfinder comprising:

an objective optical system, having a positive optical power, for forming a real image in an optical path;

an eyepiece optical system, having a positive optical power, for transmitting the real image formed by the objective optical system to a pupil of an observer; and an erecting optical system, disposed in the optical path, for inverting the real image formed by the objective optical system, wherein the objective optical system consists of three lens units arranged in the following order, from an object side of the objective optical system:

a first lens unit having a positive optical power; and
two succeeding lens units, wherein the first lens unit is moved to adjust dioptric power, and zooming is achieved by moving at least two of the succeeding lens units in such a way that magnification is variable within a range extending to both sides of unity magnification.

* * * * *